US00RE48131E

(19) United States
(12) Reissued Patent
Pignataro et al.

(10) Patent Number: US RE48,131 E
(45) Date of Reissued Patent: Jul. 28, 2020

(54) METADATA AUGMENTATION IN A SERVICE FUNCTION CHAIN

(71) Applicant: CISCO TECHNOLOGY, INC., San Jose, CA (US)

(72) Inventors: Carlos M. Pignataro, Raleigh, NC (US); James N. Guichard, New Boston, NH (US); Nagendra Kumar Nainar, Morrisville, NC (US); Paul Quinn, Wellesley, MA (US)

(73) Assignee: CISCO TECHNOLOGY, INC., San Jose, CA (US)

(21) Appl. No.: 15/630,859

(22) Filed: Jun. 22, 2017

Related U.S. Patent Documents

Reissue of:
(64) Patent No.: 9,571,405
Issued: Feb. 14, 2017
Appl. No.: 14/631,595
Filed: Feb. 25, 2015

U.S. Applications:
(60) Provisional application No. 62/090,821, filed on Dec. 11, 2014.

(51) Int. Cl.
*H04L 12/851* (2013.01)
*H04L 12/741* (2013.01)
(Continued)

(52) U.S. Cl.
CPC ..... *H04L 47/2441* (2013.01); *H04L 45/74* (2013.01); *H04L 47/18* (2013.01); *H04L 69/22* (2013.01)

(58) Field of Classification Search
CPC ..... H04L 47/2241
See application file for complete search history.

(56) References Cited

U.S. PATENT DOCUMENTS 3,629,512 A 12/1971 Yuan
4,769,811 A 9/1988 Eckberg, Jr. et al.
(Continued)

FOREIGN PATENT DOCUMENTS

CN 103716123 4/2014
CN 103716137 4/2014
(Continued)

OTHER PUBLICATIONS

Aldrin, S., et al. "Service Function Chaining Operation, Administration and Maintenance Framework," Internet Engineering Task Force, Oct. 26, 2014, 13 pages.
(Continued)

*Primary Examiner* — Eron J Sorrell
(74) *Attorney, Agent, or Firm* — Polsinelli PC

(57) ABSTRACT

A method for augmenting metadata of a network service header is disclosed. The method includes receiving, at a first service node, a packet or frame of a traffic flow, wherein the packet has a payload and the network service header including a first metadata and a first service path information for the traffic flow, classifying, by the first service node, at least one of the payload and the first metadata to generate a second metadata different from the first metadata, and augmenting, by the first service node, the first metadata using the second metadata before forwarding the packet or frame to a second service node.

17 Claims, 15 Drawing Sheets

(51) Int. Cl.
*H04L 29/06* (2006.01)
*H04L 12/801* (2013.01)

(56) References Cited

U.S. PATENT DOCUMENTS 5,408,231 A 4/1995 Bowdon
5,491,690 A 2/1996 Alfonsi et al.
5,557,609 A 9/1996 Shobatake et al.
5,600,638 A 2/1997 Bertin et al.
5,687,167 A 11/1997 Bertin et al.
6,115,384 A 9/2000 Parzych
6,167,438 A 12/2000 Yates et al.
6,400,681 B1 6/2002 Bertin et al.
6,661,797 B1 12/2003 Goel et al.
6,687,229 B1 2/2004 Kataria et al.
6,799,270 B1 9/2004 Bull et al.
6,888,828 B1 5/2005 Partanen et al.
6,993,593 B2 1/2006 Iwata
7,027,408 B2 4/2006 Nabkel et al.
7,062,567 B2 6/2006 Benitez et al.
7,095,715 B2 8/2006 Buckman et al.
7,096,212 B2 8/2006 Tribble et al.
7,139,239 B2 11/2006 Mcfarland
7,165,107 B2 1/2007 Pouyoul et al.
7,197,008 B1 3/2007 Shabtay et al.
7,197,660 B1 3/2007 Liu et al.
7,209,435 B1 4/2007 Kuo et al.
7,227,872 B1 6/2007 Biswas et al.
7,231,462 B2 6/2007 Berthaud et al.
7,333,990 B1 2/2008 Thiagarajan et al.
7,443,796 B1 10/2008 Albert et al.
7,458,084 B2 11/2008 Zhang et al.
7,472,411 B2 12/2008 Wing et al.
7,486,622 B2 2/2009 Regan et al.
7,536,396 B2 5/2009 Johnson et al.
7,552,201 B2 6/2009 Areddu et al.
7,558,261 B2 7/2009 Arregoces et al.
7,567,504 B2 7/2009 Darling et al.
7,571,470 B2 8/2009 Arregoces et al.
7,573,879 B2 8/2009 Narad et al.
7,610,375 B2 10/2009 Portolani et al.
7,643,468 B1 1/2010 Arregoces et al.
7,644,182 B2 1/2010 Banerjee et al.
7,647,422 B2 1/2010 Singh et al.
7,657,898 B2 2/2010 Sadiq
7,657,940 B2 2/2010 Portolani et al.
7,668,116 B2 2/2010 Wijnands et al.
7,684,321 B2 3/2010 Muirhead et al.
7,738,469 B1 6/2010 Shekokar et al.
7,751,409 B1 7/2010 Carolan
7,793,157 B2 9/2010 Bailey et al.
7,814,284 B1 10/2010 Glass et al.
7,831,693 B2 11/2010 Lai
7,852,785 B2 12/2010 Lund et al.
7,860,095 B2 12/2010 Forissier et al.
7,860,100 B2 12/2010 Khalid
7,895,425 B2 2/2011 Khalid et al.
7,899,012 B2 3/2011 Ho et al.
7,899,861 B2 3/2011 Feblowitz et al.
7,907,595 B2 3/2011 Khanna et al.
7,908,480 B2 3/2011 Firestone et al.
7,983,174 B1 7/2011 Monaghan et al.
7,990,847 B1 8/2011 Leroy et al.
8,000,329 B2 8/2011 Fendick et al.
8,018,938 B1 9/2011 Fromm et al.
8,094,575 B1 1/2012 Vadlakonda et al.
8,095,683 B2 1/2012 Balasubramaniam Chandra
8,116,307 B1 2/2012 Thesayi et al.
8,166,465 B2 4/2012 Feblowitz et al.
8,180,909 B2 5/2012 Hartman et al.
8,191,119 B2 5/2012 Wing et al.
8,195,774 B2 6/2012 Lambeth et al.
8,280,354 B2 10/2012 Smith et al.
8,281,302 B2 10/2012 Durazzo et al.
8,291,108 B2 10/2012 Raja et al.
8,305,900 B2 11/2012 Bianconi
8,311,045 B2 11/2012 Quinn et al.
8,316,457 B1 11/2012 Paczkowski et al.
8,355,332 B2 1/2013 Beaudette et al.
8,442,043 B2 5/2013 Sharma et al.
8,451,817 B2 5/2013 Cheriton
8,464,336 B2 6/2013 Wei et al.
8,473,981 B1 6/2013 Gargi
8,479,298 B2 7/2013 Keith et al.
8,498,414 B2 7/2013 Rossi
8,520,672 B2 8/2013 Guichard et al.
8,601,152 B1 12/2013 Chou
8,605,588 B2 12/2013 Sankaran et al.
8,612,612 B1 12/2013 Dukes et al.
8,627,328 B2 1/2014 Mousseau et al.
8,645,952 B2 2/2014 Biswas et al.
8,676,965 B2 3/2014 Gueta
8,676,980 B2 3/2014 Kreeger et al.
8,700,892 B2 4/2014 Bollay et al.
8,724,466 B2 5/2014 Kenigsberg et al.
8,730,980 B2 5/2014 Bagepalli et al.
8,743,885 B2 6/2014 Khan et al.
8,751,420 B2 6/2014 Hjelm et al.
8,762,534 B1 6/2014 Hong et al.
8,762,707 B2 6/2014 Killian et al.
8,792,490 B2 7/2014 Jabr et al.
8,793,400 B2 7/2014 Mcdysan et al.
8,812,730 B2 8/2014 Vos et al.
8,819,419 B2 8/2014 Carlson et al.
8,825,070 B2 9/2014 Akhtar et al.
8,830,834 B2 9/2014 Sharma et al.
8,904,037 B2 12/2014 Haggar et al.
8,984,284 B2 3/2015 Purdy, Sr. et al.
9,001,827 B2 4/2015 Appenzeller
9,071,533 B2 6/2015 Hui et al.
9,077,661 B2 7/2015 Andreasen et al.
9,088,584 B2 7/2015 Feng et al.
9,130,872 B2 9/2015 Kumar et al.
9,143,438 B2 9/2015 Khan et al.
9,160,797 B2 10/2015 Mcdysan
9,178,812 B2 11/2015 Guichard et al.
9,189,285 B2 11/2015 Ng et al.
9,203,711 B2 12/2015 Agarwal et al.
9,253,274 B2 2/2016 Quinn et al.
9,300,579 B2 3/2016 Frost et al.
9,300,585 B2 3/2016 Kumar et al.
9,311,130 B2 4/2016 Christenson et al.
9,319,324 B2 4/2016 Beheshti-Zavareh et al.
9,325,565 B2 4/2016 Yao et al.
9,338,097 B2 5/2016 Anand et al.
9,344,337 B2 5/2016 Kumar et al.
9,374,297 B2 6/2016 Bosch et al.
9,379,931 B2 6/2016 Bosch et al.
9,385,950 B2 7/2016 Quinn et al.
9,398,486 B2 7/2016 La Roche, Jr. et al.
9,407,540 B2 8/2016 Kumar et al.
9,413,655 B2 8/2016 Shatzkamer et al.
9,424,065 B2 8/2016 Singh et al.
9,436,443 B2 9/2016 Chiosi et al.
9,444,675 B2 9/2016 Guichard et al.
9,473,570 B2 10/2016 Bhanujan et al.
9,479,443 B2 10/2016 Bosch et al.
9,491,094 B2 11/2016 Patwardhan et al.
9,537,836 B2 1/2017 Mailer et al.
9,558,029 B2 1/2017 Behera et al.
9,559,970 B2 1/2017 Kumar et al.
9,571,405 B2 2/2017 Pignataro et al.
9,608,896 B2 3/2017 Kumar et al.
9,614,739 B2 4/2017 Kumar et al.
9,634,945 B2 * 4/2017 Stevens ..... H04L 47/2441
9,660,909 B2 5/2017 Guichard et al.
9,723,106 B2 8/2017 Shen et al.
9,774,533 B2 9/2017 Zhang et al.
9,794,379 B2 10/2017 Kumar et al.
9,882,776 B2 1/2018 Aybay et al.
9,929,945 B2 3/2018 Schultz et al.
10,003,530 B2 6/2018 Zhang et al.
2001/0023442 A1 9/2001 Masters
2002/0085562 A1 7/2002 Hufferd et al.

(56) References Cited

U.S. PATENT DOCUMENTS

2002/0091776 A1* 7/2002 Nolan ..... G06Q 10/107 709/206
2002/0131362 A1 9/2002 Callon
2002/0156893 A1 10/2002 Pouyoul et al.
2002/0167935 A1 11/2002 Nabkel et al.
2003/0023879 A1 1/2003 Wray
2003/0026257 A1* 2/2003 Xu ..... H04L 29/06 370/392
2003/0037070 A1 2/2003 Marston
2003/0088698 A1 5/2003 Singh et al.
2003/0110081 A1 6/2003 Tosaki et al.
2003/0120816 A1 6/2003 Berthaud et al.
2003/0123446 A1* 7/2003 Muirhead ..... H04L 12/4641 370/392
2003/0214913 A1 11/2003 Kan et al.
2003/0226142 A1 12/2003 Rand
2004/0109412 A1 6/2004 Hansson et al.
2004/0148391 A1 7/2004 Shannon, Sr. et al.
2004/0199812 A1 10/2004 Earl
2004/0213160 A1 10/2004 Regan et al.
2004/0264481 A1 12/2004 Darling et al.
2004/0268357 A1 12/2004 Joy et al.
2005/0044197 A1 2/2005 Lai
2005/0058118 A1 3/2005 Davis
2005/0060572 A1 3/2005 Kung
2005/0086367 A1 4/2005 Conta et al.
2005/0120101 A1 6/2005 Nocera
2005/0152378 A1 7/2005 Bango et al.
2005/0157645 A1 7/2005 Rabie et al.
2005/0160180 A1 7/2005 Rabje et al.
2005/0204042 A1 9/2005 Banerjee et al.
2005/0210096 A1 9/2005 Bishop et al.
2005/0257002 A1 11/2005 Nguyen
2005/0281257 A1 12/2005 Yazaki et al.
2005/0286540 A1 12/2005 Hurtta et al.
2005/0289244 A1 12/2005 Sahu et al.
2006/0005240 A1 1/2006 Sundarrajan et al.
2006/0031374 A1 2/2006 Lu et al.
2006/0045024 A1 3/2006 Previdi et al.
2006/0074502 A1 4/2006 Mcfarland
2006/0092950 A1 5/2006 Arregoces et al.
2006/0095960 A1 5/2006 Arregoces et al.
2006/0112400 A1 5/2006 Zhang et al.
2006/0155862 A1 7/2006 Kathi et al.
2006/0168223 A1 7/2006 Mishra et al.
2006/0191008 A1* 8/2006 Fernando ..... G06F 21/554 726/23
2006/0233106 A1 10/2006 Achlioptas et al.
2006/0233155 A1 10/2006 Srivastava
2007/0061441 A1 3/2007 Landis et al.
2007/0067435 A1 3/2007 Landis et al.
2007/0094397 A1 4/2007 Krelbaum et al.
2007/0143851 A1 6/2007 Nicodemus et al.
2007/0237147 A1 10/2007 Quinn et al.
2007/0250836 A1 10/2007 Li et al.
2008/0056153 A1 3/2008 Liu
2008/0080509 A1 4/2008 Khanna et al.
2008/0080517 A1 4/2008 Roy et al.
2008/0170542 A1 7/2008 Hu
2008/0177896 A1* 7/2008 Quinn ..... G06F 9/5055 709/238
2008/0181118 A1 7/2008 Sharma et al.
2008/0196083 A1 8/2008 Parks et al.
2008/0209039 A1 8/2008 Tracey et al.
2008/0219287 A1 9/2008 Krueger et al.
2008/0225710 A1 9/2008 Raja et al.
2008/0291910 A1 11/2008 Tadimeti et al.
2009/0003364 A1 1/2009 Fendick et al.
2009/0006152 A1 1/2009 Timmerman et al.
2009/0037713 A1 2/2009 Khalid et al.
2009/0094684 A1 4/2009 Chinnusamy et al.
2009/0204612 A1 8/2009 Keshavarz-nia et al.
2009/0271656 A1 10/2009 Yokota et al.
2009/0300207 A1 12/2009 Giaretta et al.
2009/0305699 A1 12/2009 Deshpande et al.
2009/0328054 A1 12/2009 Paramasivam et al.
2010/0058329 A1 3/2010 Durazzo et al.
2010/0063988 A1 3/2010 Khalid
2010/0080226 A1 4/2010 Khalid
2010/0165985 A1 7/2010 Sharma et al.
2010/0191612 A1 7/2010 Raleigh
2010/0211658 A1 8/2010 Hoogerwerf et al.
2011/0023090 A1 1/2011 Asati et al.
2011/0032833 A1 2/2011 Zhang et al.
2011/0055845 A1 3/2011 Nandagopal et al.
2011/0131338 A1 6/2011 Hu
2011/0137991 A1 6/2011 Russell
2011/0142056 A1 6/2011 Manoj
2011/0161494 A1 6/2011 Mcdysan et al.
2011/0222412 A1 9/2011 Kompella
2011/0255538 A1 10/2011 Srinivasan et al.
2011/0267947 A1 11/2011 Dhar et al.
2012/0042060 A1* 2/2012 Jackowski ..... H04L 47/2475 709/224
2012/0131662 A1 5/2012 Kuik et al.
2012/0147894 A1 6/2012 Mulligan et al.
2012/0324442 A1 12/2012 Barde
2012/0331135 A1 12/2012 Alon et al.
2013/0003735 A1 1/2013 Chao et al.
2013/0003736 A1 1/2013 Szyszko et al.
2013/0040640 A1 2/2013 Chen et al.
2013/0044636 A1 2/2013 Koponen et al.
2013/0121137 A1 5/2013 Feng et al.
2013/0124708 A1 5/2013 Lee et al.
2013/0163594 A1 6/2013 Sharma et al.
2013/0163606 A1 6/2013 Bagepalli et al.
2013/0238806 A1 9/2013 Moen
2013/0272305 A1 10/2013 Lefebvre et al.
2013/0311675 A1 11/2013 Kancherla
2013/0329584 A1 12/2013 Ghose et al.
2014/0010083 A1 1/2014 Hamdi
2014/0010096 A1 1/2014 Kamble et al.
2014/0036730 A1 2/2014 Nellikar et al.
2014/0050223 A1 2/2014 Foo et al.
2014/0067758 A1 3/2014 Boldyrev et al.
2014/0105062 A1 4/2014 McDysan et al.
2014/0181267 A1 6/2014 Wadkins et al.
2014/0254603 A1 9/2014 Banavalikar et al.
2014/0259012 A1 9/2014 Nandlall et al.
2014/0279863 A1 9/2014 Krishnamurthy et al.
2014/0280836 A1 9/2014 Kumar et al.
2014/0317261 A1 10/2014 Shatzkamer et al.
2014/0321459 A1 10/2014 Kumar
2014/0334295 A1 11/2014 Guichard et al.
2014/0334488 A1 11/2014 Guichard et al.
2014/0344439 A1 11/2014 Kempf et al.
2014/0362682 A1 12/2014 Guichard et al.
2014/0362857 A1 12/2014 Guichard et al.
2014/0369209 A1 12/2014 Khurshid et al.
2014/0376558 A1 12/2014 Rao et al.
2015/0003455 A1 1/2015 Haddad et al.
2015/0012584 A1 1/2015 Lo et al.
2015/0012988 A1 1/2015 Jeng et al.
2015/0029871 A1 1/2015 Frost et al.
2015/0032871 A1 1/2015 Allan et al.
2015/0052516 A1 2/2015 French et al.
2015/0071285 A1 3/2015 Kumar et al.
2015/0074276 A1 3/2015 DeCusatis et al.
2015/0082308 A1 3/2015 Kiess et al.
2015/0085635 A1 3/2015 Wijnands et al.
2015/0085870 A1 3/2015 Narasimha et al.
2015/0089082 A1 3/2015 Patwardhan et al.
2015/0092564 A1 4/2015 Aldrin
2015/0103827 A1 4/2015 Quinn et al.
2015/0117308 A1 4/2015 Kant
2015/0124622 A1 5/2015 Kovvali et al.
2015/0131484 A1 5/2015 Aldrin
2015/0131660 A1 5/2015 Shepherd et al.
2015/0156035 A1 6/2015 Foo et al.
2015/0180725 A1 6/2015 Varney et al.
2015/0180767 A1 6/2015 Tam et al.
2015/0181309 A1 6/2015 Shepherd et al.
2015/0188949 A1 7/2015 Mahaffey et al.

(56) References Cited

U.S. PATENT DOCUMENTS

| | | | |
|---|---|---|---|
| 2015/0195197 | A1 | 7/2015 | Yong et al. |
| 2015/0222516 | A1 | 8/2015 | Deval et al. |
| 2015/0222533 | A1 | 8/2015 | Birrittella et al. |
| 2015/0236948 | A1 | 8/2015 | Dunbar |
| 2015/0319078 | A1 | 11/2015 | Lee et al. |
| 2015/0319081 | A1 | 11/2015 | Kasturi et al. |
| 2015/0326473 | A1 | 11/2015 | Dunbar |
| 2015/0333930 | A1 | 11/2015 | Aysola et al. |
| 2015/0334027 | A1 | 11/2015 | Bosch et al. |
| 2015/0341285 | A1 | 11/2015 | Aysola et al. |
| 2015/0365495 | A1 | 12/2015 | Fan et al. |
| 2015/0381465 | A1 | 12/2015 | Narayanan et al. |
| 2015/0381557 | A1 | 12/2015 | Fan et al. |
| 2016/0028604 | A1 | 1/2016 | Chakrabarti et al. |
| 2016/0028640 | A1 | 1/2016 | Zhang |
| 2016/0043952 | A1 | 2/2016 | Zhang |
| 2016/0050117 | A1 | 2/2016 | Voellmy et al. |
| 2016/0050132 | A1 | 2/2016 | Zhang |
| 2016/0080263 | A1 | 3/2016 | Park et al. |
| 2016/0080496 | A1 | 3/2016 | Falanga et al. |
| 2016/0099853 | A1 | 4/2016 | Nedeltchev et al. |
| 2016/0119159 | A1 | 4/2016 | Zhao et al. |
| 2016/0119253 | A1 | 4/2016 | Kang et al. |
| 2016/0127139 | A1 | 5/2016 | Tian et al. |
| 2016/0134518 | A1 | 5/2016 | Callon et al. |
| 2016/0134535 | A1 | 5/2016 | Callon |
| 2016/0139939 | A1 | 5/2016 | Bosch et al. |
| 2016/0164776 | A1 | 6/2016 | Biancaniello |
| 2016/0165014 | A1 | 6/2016 | Nainar et al. |
| 2016/0173373 | A1 | 6/2016 | Guichard |
| 2016/0173464 | A1 | 6/2016 | Wang et al. |
| 2016/0182336 | A1 | 6/2016 | Doctor et al. |
| 2016/0182342 | A1 | 6/2016 | Singaravelu et al. |
| 2016/0182684 | A1 | 6/2016 | Connor et al. |
| 2016/0212017 | A1 | 7/2016 | Li et al. |
| 2016/0226742 | A1 | 8/2016 | Apathotharanan et al. |
| 2016/0277250 | A1 | 9/2016 | Maes |
| 2016/0285720 | A1 | 9/2016 | Mäenpääet al. |
| 2016/0323165 | A1 | 11/2016 | Boucadair et al. |
| 2016/0352629 | A1 | 12/2016 | Wang et al. |
| 2016/0380966 | A1 | 12/2016 | Gunnalan et al. |
| 2017/0019303 | A1 | 1/2017 | Swamy et al. |
| 2017/0031804 | A1 | 2/2017 | Ciszewski et al. |
| 2017/0078175 | A1 | 3/2017 | Xu et al. |
| 2017/0187609 | A1 | 6/2017 | Lee et al. |
| 2017/0208000 | A1 | 7/2017 | Bosch et al. |
| 2017/0214627 | A1 | 7/2017 | Zhang et al. |
| 2017/0237656 | A1 | 8/2017 | Gage et al. |
| 2017/0250917 | A1 | 8/2017 | Ruckstuhl et al. |
| 2017/0272470 | A1 | 9/2017 | Gundamaraju et al. |
| 2017/0279712 | A1 | 9/2017 | Nainar et al. |
| 2017/0310611 | A1 | 10/2017 | Kumar et al. |
| 2017/0331741 | A1 | 11/2017 | Fedyk et al. |
| 2018/0013841 | A1 | 1/2018 | Nainar et al. |
| 2018/0026884 | A1 | 1/2018 | Nainar et al. |
| 2018/0026887 | A1 | 1/2018 | Nainar et al. |
| 2018/0041470 | A1 | 2/2018 | Schultz et al. |
| 2018/0062991 | A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2006/073804 | 7/2006 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2016/094907 | 6/2016 |
| WO | WO 2017/011607 | 1/2017 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; http://cloud.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipeda.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidegerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Val bonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial

(56) References Cited

OTHER PUBLICATIONS

Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE 3rd International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Cisco Systems, Inc. "Cisco NSH Service Chaining Configuration Guide," Jul. 28, 2017, 11 pages.
Cisco Systems, Inc. "Cisco VN-Link: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration—An Overview," Presentation at the IETF# 88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.
Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," Dots, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft.ietf-sfc-nsh-00.pdf.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/htnnl/draft-snnpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-could-native-apps-will-look-like/.
Zhang, Ying, et al. "StEERING: A Software-Defined Networking for Inline Service Chaining," IEEE, 2013, IEEE, p. 10 pages.
Bremier-Barr, et al., "Deep Packet Inspection as a Service," CoNEXT '14, Dec. 2-5, 2014, Sydney, Australia; 12 pages; http://conferences2.sigcomm.org/co next/2014/CoNEXT_papers/p271.pdf.
Quinn, et al., "Service Function Chaining Creating a Service Plane Using Network Service Header (NSH)," published Nov. 19, 2014; 7 pages https://www.opennetworking.org/images/stories/downloads/sdn-resources/IEEE-papers/service-function-chaining.pdf.
U.S. Appl. No. 14/664,629, filed Mar. 20, 2015 entitled "Network Service Header Metadata for Load Balancing," Inventors: Carlos M. Pignataro et al.
Bremier-Barr, et al., "Deep Packet Inspection as a Service," CoNEXT '14, Dec. 2-5, 2014, Sydney, Australia; 12 pages; http://conferences2.sigcomm.org/co next/2014/CoNEXT.sub._papers/p271.pdf.
Quinn, P., et al., "Network Service Chaining Problem Statement," Network Working Group, Aug. 26, 2013, 18 pages; https://tools.ietf.org/html/draft-quinn-nsc-problem-statement-03.
Quinn, P., et al., "Network Service Header," Network Working Group, Jul. 3, 2014, 27 pages; https://tools.ietf.org/html/draft-quinn-sfc-nsh-03.txt.
Kumbhare, et al., "OpenDaylight Service Function Chaining Use-Cases," Ericsson, Oct. 14, 2014, 25 pages.
"Service-Aware Network Architecture Based on SDN, NFV, and Network Intelligence," Intel White Paper, Intel Architecture Processors, Qosmos* DPI Technology, Networking and Communications, Nov. 11, 2014, 8 pages.
Halpern, J., et al., "Service Function Chaining (SFC) Architecture," Network Working Group, Sep. 20, 2014, 26 pages; https://tools.ietf.org/html/draft-ietf-sfc-architecture-02.
Quinn, et al., "Service Function Chaining Creating a Service Plane Using Network Service Header (NSH)," published Nov. 19, 2014, 20 pages; https://www.opennetworking.org/images/stories/downloads/sdn-resources/IEE- E-papers/service-function-chaining.pdf.
PCT Mar. 22, 2016 International Search Report and Written Opinion of the International Searching Authority from International Application PCT/US2015/065610; 13 pages.
USPTO Oct. 4, 2016 Non-Final Office Action from U.S. Appl. No. 14/664,629.

* cited by examiner

METADATA AUGMENTATION IN A SERVICE FUNCTION CHAIN

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application *is a reissue application of U.S. Pat. No. 9,571,405 entitled METADATA AUGMENTATION IN A SERVICE FUNCTION CHAIN filed Feb. 25, 2015, which* claims the benefit of priority under 35 U.S.C. §119(e) to U.S. Provisional Application Ser. No. 62/090,821 entitled "METADATA AUGMENTATION IN A SERVICE FUNCTION CHAIN AND NETWORK SERVICE HEADER (NSH) METADATA BASED LOAD BALANCING" filed Dec. 11, 2014, which is hereby incorporated by reference in its entirety.

TECHNICAL FIELD

This disclosure relates in general to the field of communications and, more particularly, to metadata augmentation in a service function chain.

BACKGROUND

In computer networking, network administrators are often concerned with how to best route traffic flows from one end point to another end point across a network. When provisioning a route for a traffic flow, administrators may implement policies to ensure that certain service functions are applied to the packet or the traffic flow as it traverses across the network. Service functions can provide security, wide area network (WAN) acceleration, and loadbalancing. These service functions can be implemented at various points in the network infrastructure, such as the wide area network, data center, campus, etc. Network elements providing these service functions are generally referred to as "service nodes."

Traditionally, service node deployment is dictated by the network topology. For instance, firewalls are usually deployed at the edge of an administrative zone for filtering traffic leaving or entering the particular zone according to a policy for that zone. With the rise of virtual platforms and more agile networks, service node deployment can no longer be bound by the network topology. To enable service nodes to be deployed anywhere on a network, a solution called Service Function Chaining (SFC) Architecture (IETF draft-ietf-sfc-architecture-04, Sep. 20, 2014) and Network Service Header (NSH) (IETF draft-quinn-sfc-nsh-03, Jul. 3, 2014) have been provided to encapsulated packets or frames to prescribe service paths for traffic flows through the appropriate service nodes. Specifically, Network Service Headers provide data plane encapsulation that utilizes the network overlay topology used to deliver packets to the requisite services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1A:
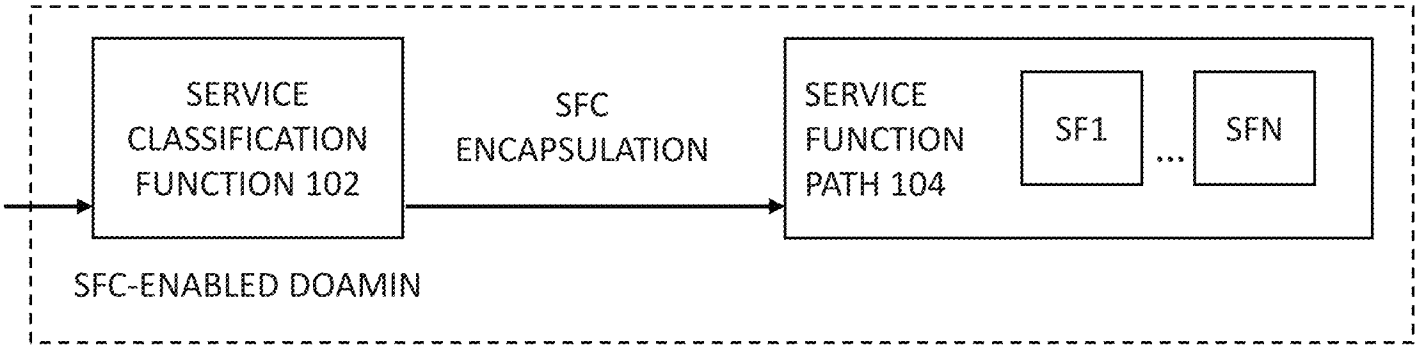
FIG. 1A illustrates a Service Function Chain (SFC), which may include an initial Classification function, as an entry point into a Service Function Path (SFP), according to some embodiments of the disclosure.

This present disclosure describes metadata augmentation in a service function path. There are various use cases that benefit with metadata based classification and augmentation. Advantageous features include, but are not limited to, (1) augmenting service function chain (SFC) metadata using recursive classification within an service function path (SFP) (not necessarily not for branching), and (2) reducing classification load on access/edge nodes by performing minimal classification and adding metadata to be used by secondary (dedicated/virtualized) classifier to augment the metadata.

A method for augmenting metadata of a network service header is disclosed. The method includes receiving, at a first service node, a packet or frame of a traffic flow, wherein the packet has a payload and the network service header including a first metadata and a first service path information for the traffic flow, classifying, by the first service node, at least one of the payload and the first metadata to generate a second metadata different from the first metadata, and augmenting, by the first service node, the first metadata using the second metadata before forwarding the packet or frame to a second service node.

In some embodiments, augmenting the first metadata comprises appending the second metadata to the first metadata of the network service header or adding the second metadata to the network service header. In some embodiments, augmenting the first metadata comprises replacing the first metadata of the network service header with the second metadata.

In some embodiments, the network service header including the first metadata and the first service path information is a result of an initial classification of the packet or frame performed by an initial service classifier, and the classification performed by the first service node is different from the initial classification.

In some embodiments, the initial service classifier is not capable of performing the classification performed by the first service node.

In some embodiments, the second metadata corrects an error of the first metadata. In some embodiments, the second metadata refines the initial classification with additional information about the packet or frame of the traffic flow. In some embodiments, wherein the second service node applies a policy on the packet or frame of the traffic flow based on the second metadata.

In some embodiments, augmenting the first metadata using the second metadata comprises: generating a different network service header having the second metadata, and encapsulating the packet or frame of the traffic flow with the different network service header.

In some embodiments, the method further includes generating a second service path information different from the first service path information in response to generating the second metadata; and replacing the network service header with a different network service header having the second metadata and the second service path information.

In some embodiments, semantics of the second metadata of the network service header is shared via a control plane of the first service node and the second service node.

EXAMPLE EMBODIMENTS

Basics of Network Service Chaining or Service Function Chains in a Network

To accommodate agile networking and flexible provisioning of network nodes in the network, Service Function Chains (SFC) can be used to ensure an ordered set of Service Functions (SF) to be applied to packets and/or frames of a traffic flow. SFCs provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification. The implied order may not be a linear progression as the architecture allows for nodes that copy to more than one branch. The term service chain is often used as shorthand for service function chain.

FIG. 1A illustrates a Service Function Chain (SFC), which may include an initial service classification function 102, as an entry point into a Service Function Path (SFP) 104 (or service path). The (initial) service classification function 102 prescribes a service path, and encapsulates a packet or frame with the service path information which identifies the service path. The classification potentially adds metadata, or shared context, to the SFC encapsulation part of the packet or frame. The service function path 104 may include a plurality of service functions (shown as "SF1", . . . "SFN").

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by the at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers, NAT44, NAT64, HOST_ID injection, HTTP Header Enrichment functions, TCP optimizer, etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a classifier through the requisite service functions.

Figure 1B:
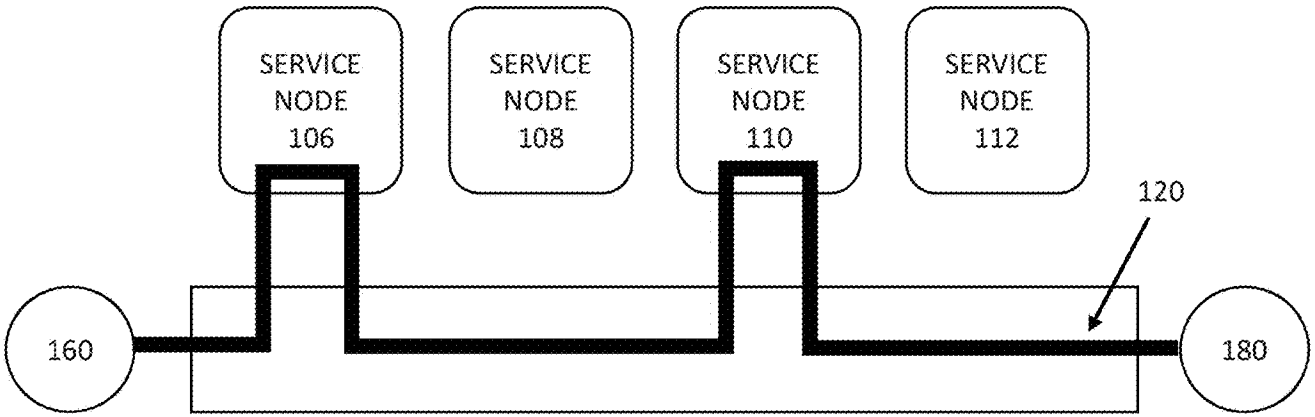
FIGS. 1B-C illustrate different service paths realized using service function chaining, according to some embodiments of the disclosure.
Figure 1C:
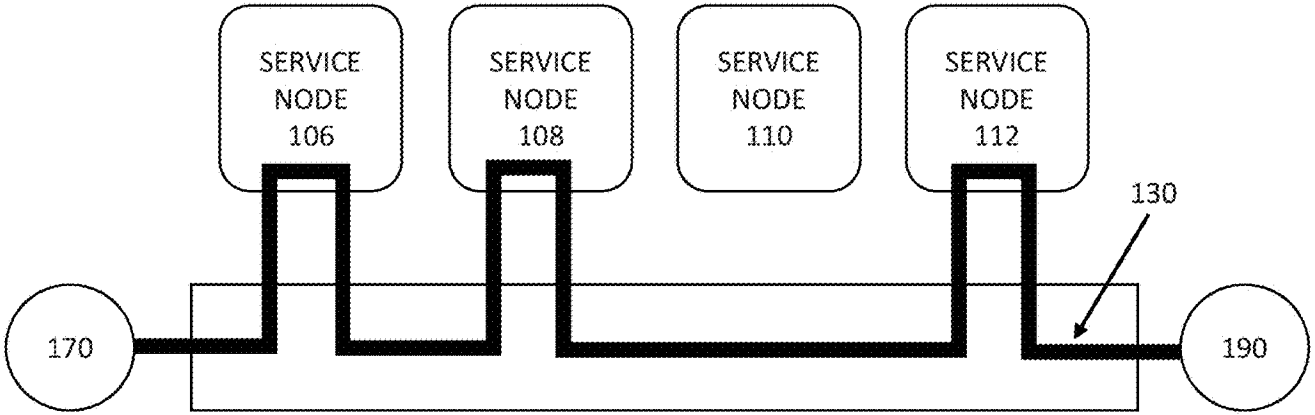

FIGS. 1B-C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 1B, a service path 120 can be provided between end point 160 and endpoint 180 through service node 106 and service node 110. In the example shown in FIG. 1C, a service path 130 (a different instantiation) can be provided between end point 170 and endpoint 190 through service node 106, service node 108, and service node 112.

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 2:
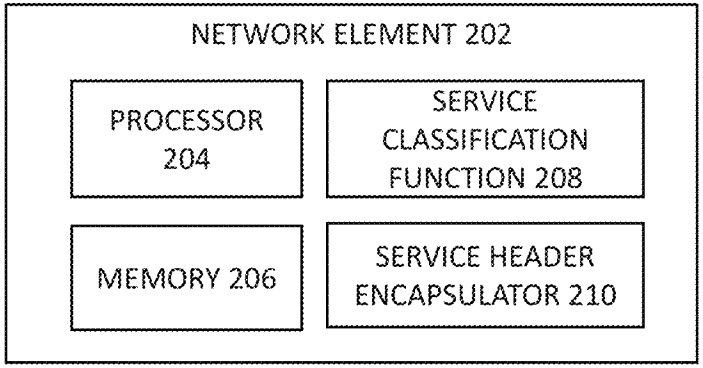
FIG. 2 shows a system view of a Service Chain Function-aware network element for prescribing a service path of a traffic flow, according to some embodiments of the disclosure.

FIG. 2 shows a system view of SFC-aware network element, e.g., such as a (initial) service classifier (SCL), for prescribing a service path of a traffic flow, according to some embodiments of the disclosure. Network element 202 includes processor 204, (computer-readable non-transitory) memory 206 for storing data and instructions. Furthermore, network element 202 includes service classification function 208 and service header encapsulator 210 (both can be provided by processor 204 when processor 204 executes the instructions stored in memory 206).

The service classification function 208 can process a packet of a traffic flow and determine whether the packet requires servicing and correspondingly which service path to follow to apply the appropriate service. The determination can be performed based on business policies and/or rules stored in memory 206. Once the determination of the service path is made, service header encapsulator 210 generates an appropriate NSH having identification information for the service path and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 202 can also remove the NSH if the service classification function 208 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Service Nodes and Proxy Nodes

Figure 3:
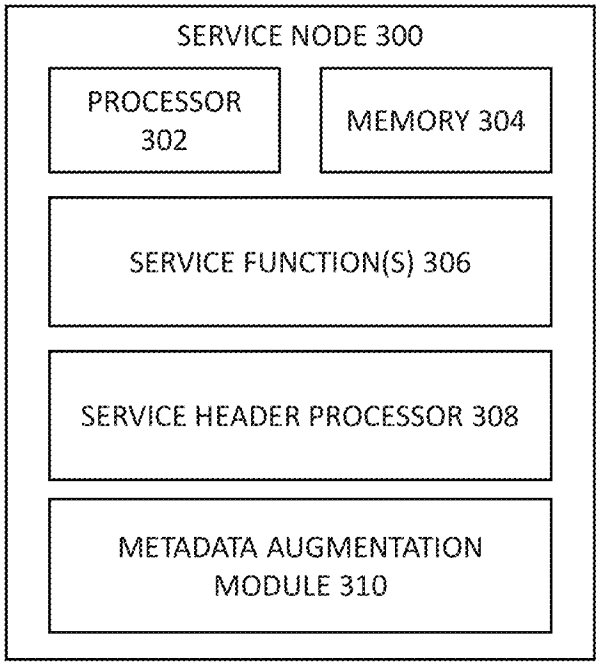
FIG. 3 shows a system view of a service node, according to some embodiments of the disclosure.

Once properly encapsulated, the packet having the NSF is then forwarded to one or more service nodes where service(s) can be applied to the packet/frame. FIG. 3 shows a system view of a service node, according to some embodiments of the disclosure. Service node 300, generally a network element, can include processor 302, (computer-readable non-transitory) memory 304 for storing data and instructions. Furthermore, service node 300 includes service function(s) 306 (e.g., for applying service(s) to the packet/frame, classifying the packet/frame) and service header processor 308. The service functions(s) 306 and service header processor 306 can be provided by processor 302 when processor 302 executes the instructions stored in memory 304. Service header processor 308 can extract the NSH, and in some cases, update the NSH as needed. For instance, the service header processor 308 can decrement the service index if a service index=0 is used to indicate that a packet is to be dropped by the service node 300. In another instance, the service header processor 308 or some other suitable module provide by the service node can update context header fields if new/updated context is available.

Metadata Augmentation

Besides general servicing of the NSH, a service node can provide additional functionality by augmenting the metadata, e.g., by adding precision to the metadata. The present disclosure describes some exemplary methods for augmenting metadata of a NSH.

Generally speaking, metadata in the NSH reflects some form of classification. At the initial classifier, a packet or frame can be classified, where a first metadata in the NSH would reflect the classification. For example, the initial classifier can classify that the packet/frame of a traffic flow is associated with e.g., an "employee" or "guest". When a first service node in the service path processes the first metadata in the NSH, the first service node can apply a first policy accordingly based on the first metadata.

With augmentation, the first service node can also further classify the packet or frame as being associated with, e.g., application X, and accordingly generate a second metadata. The first service node can use this new information, i.e., the second metadata, to augment the first metadata. The NSH for the packet/frame can carry the second metadata, which augments the first metadata, as the packet/frame traverses to the subsequent service node(s) in the service path.

When a subsequent, second service node processes the NSH with the second metadata, the new information provided by the second metadata can affect how the second service node processes the packet or frame. For instance, the second service node may decide to deny the packet/frame because of the second metadata.

The context being shared among service nodes is improved as the metadata is augmented when the packet/frame travels over the service path. The service nodes can optionally serve as a supplemental/additional "classifier" in the service path by classifying the packet/frame using their own capabilities. Through augmentation, a service node in the service path can contribute to the information being shared over the service function chain. The semantics (e.g., meaning, encoding scheme) can be conveyed in-line (in the service plane) or in the control plane.

Augmentation can be advantageous if the initial classifier does not have a particular classification functionality (or cannot conveniently or efficiently provide such functionality), or might not have information needed to know more about the packet. Common example is that the initial classifier is a hardware device that cannot look deep into the packet to get application information about the packet. The first service node, e.g., a firewall, a deep packet inspection engine, a load balancer, etc., may have greater classification capabilities. For instance, the initial classifier may provide first metadata which specifies the packet/frame as being associated with a guest (e.g., as opposed to an employee). A first service node, a deep packet inspection engine may find out that the packet/frame is associated with email (e.g., as opposed to streaming video content). The first service node can augment the first metadata by adding additional information, e.g., using second metadata which specifies the traffic is associated with email. A second service node, e.g., a firewall, can process the packet/frame based on the second metadata accordingly. For instance, the firewall can apply a policy based on the second metadata, wherein the policy may decide to block email traffic of guests. As the packet/frame traverses over the service path over onto other service nodes, more augmentation can occur. The semantics of the second metadata of the network service header can be shared via a control plane of the first service node and the second service node.

Within the context of the application, "metadata" refers to one or more pieces of information (e.g., bits of data, encoded values) in a context header section of a network service header. Metadata can refer to contents of the entire context header section, which can include the contents of one or more context header fields describing various attributes of the packet/frame. Metadata can also refer to contents of one individual context header field or a subset of context header fields in the context header section.

Moreover, the terms "first service node" and "second service node" does not necessarily imply that the "first service node" and the "second service node" are the first and second service nodes at the beginning of the service path that the packet/frame reaches as the packet/frame traverses over the service path. For instance, the first service node can be any suitable one of the service nodes among many service nodes in the service path (e.g., third one the packet/frame reaches as it traverses the service path, fourth one, fifth one, etc.). The second service node can be any suitable one of the service node(s) subsequent to the first service node downstream in the service path.

Exemplary Advantages of Metadata Augmentation in a Service Function Chain

To provide for augmenting metadata of a network service header, the service node 300 of FIG. 3 further includes metadata augmentation module 310 (which can be provided by processor 302 when processor 302 executes the instructions stored in memory 304). The service function(s) 306 and/or service header processor 308 of the service node 300 can perform classification. Upon receipt of a packet/frame, the service function can inspect the payload, and the service header processor can inspect the metadata or other header information in the NSH. The metadata and/or the payload 15 can be used for classification purposes. For instance, the service function 306 can classify the packet/frame based on the metadata extracted from the NSH and/or the payload. The metadata augmentation module 310 can generate the second metadata based on the classification and perform augmentation of the first metadata using the second metadata.

Figure 4:
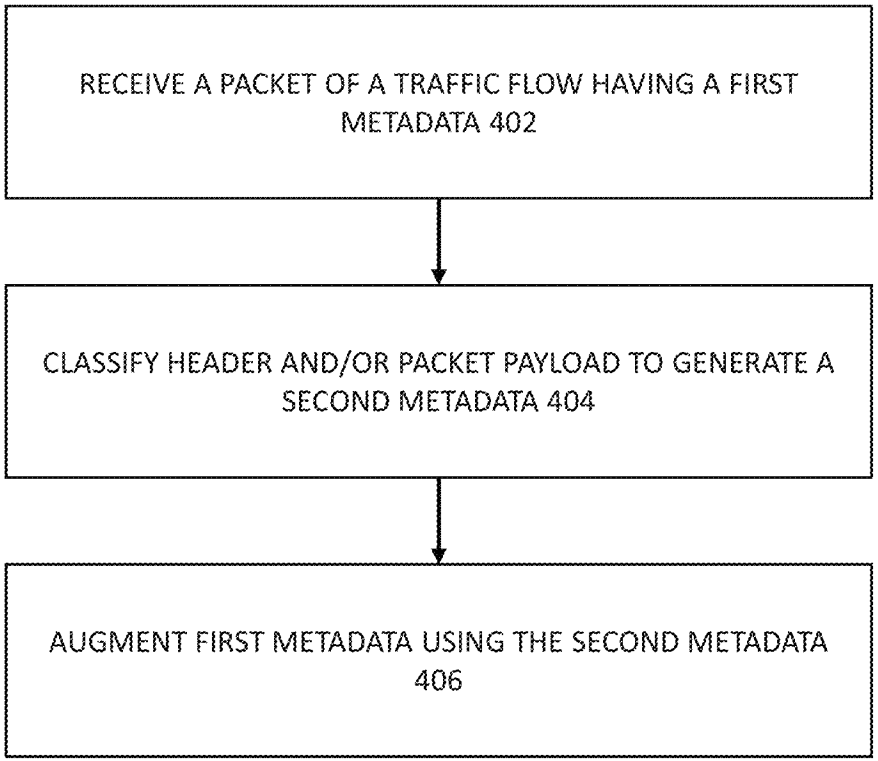
FIG. 4 shows a flow diagram illustrating a method for augmenting metadata in a network service header, according to some embodiments of the disclosure.

Specifically, various parts/modules of the service node, e.g., the service function 306, the service header processor 308, and the metadata augmentation module 310, can implement the method illustrated in FIG. 4. FIG. 4 shows a flow diagram illustrating a method for augmenting metadata in a network service header, according to some embodiments of the disclosure. Referring to box 402, a first service node receives a packet or frame of a traffic flow. The packet has a payload and the network service header including a first metadata and a first service path information for the traffic flow. Referring to box 404, the first service node classifies at least one of the payload and the first metadata to generate a second metadata different from the first metadata. Referring to box 406, the first service node augments the first metadata using the second metadata before forwarding the packet or frame to a second service function node.

Providing a mechanism for the service nodes to augment the metadata for other service nodes downstream in the SFP can have many advantages. For instance, one advantage includes simplifying or reducing the load on access/edge (or other low power) platforms by allowing other service nodes to perform further classification. Effectively, the mechanism enables minimal classification and allows minimal metadata to be used for a secondary classifier mid-SFP to augment metadata. The mechanism also allows classification based on metadata only, or metadata with additional deep packet inspection of the payload, if desired. In some cases, the metadata can be used as part of the classification input, such that a service node can augmenting the metadata and generate an output for the follow-on classifier, i.e., a service node downstream over the SFP. The mechanism effectively provides for virtualization of the classifier function; the primary classifier can add metadata to be used by a secondary classifier to augment the same.

Various Flavors of Metadata Augmentation

Augmentation of metadata can be implemented in different ways. As described, initial classification happens and as part of this classification, an SFP is chosen, and specific metadata gets potentially added to the SFC encapsulation of a packet through augmentation. The secondary classification can occur based on metadata alone or with a combination of metadata and payload details. The resulting SFC encapsulation at the first service node, augmenting the metadata, can augment the first metadata the existing metadata with additional details.

In one instance, augmenting the first metadata comprises appending the second metadata to the first metadata of the network service header or adding the second metadata to the network service header (e.g., appending the first metadata with the second metadata in the metadata field before providing the packet/frame to the subsequent service node).

In another instance, augmenting the first metadata comprises replacing the first metadata of the network service header with the second metadata (e.g., replacing the contents of the metadata field of the NSH with the second metadata before providing the packet providing the packet/frame to the subsequent service node). If desired, the resulting SFC encapsulation at the first service node, augmenting the metadata, can encapsulate the packet/frame with new metadata (SFC-in-SFC) by generating a different network service header (or other suitable outer header) having the second metadata and encapsulating the packet or frame of the traffic flow with the different network service header.

Broadly speaking, the initial classifier and the service node(s) in the SFP leverages the augmentation mechanism to provide rich and intelligent classification that affect policies being applied to various traffic flows. The augmentation mechanism enables the second service node to apply a policy on the packet or frame of the traffic flow based on the second metadata (e.g., having additional information about the packet/frame that the NSH would otherwise lack without augmentation).

Typically, the network service header including the first metadata and the first service path information is a result of an initial classification of the packet or frame performed by an initial service classifier. The classification performed by the first service node, generating the second metadata, can be different from the initial classification. The differences in classifications and functionality allow the metadata to improve as the packet/frame traverses through more classifiers. In one example, the initial service classifier is not capable of performing the classification performed by the first service node. In some cases, the second metadata can correct an error of the first metadata, if the initial service classifier did generate a correct classification. In certain cases, the second metadata refines the initial classification with additional information about the packet or frame of the traffic flow.

Policy Enforcement Using Metadata in Network Service Headers

Metadata information in the NSH is usually used for policy enforcement and network context for forwarding post service delivery. Service function instances in service nodes can derive policy selection from the NSH. Context shared in the service header can provide a range of service-relevant information such as traffic classification usable for policy enforcement. Service functions can use the NSH to select local service policy. NSH provides the ability to pass along metadata or augmented metadata over a service path.

The metadata used by various service functions may be derived from several sources. In one example, network nodes information provided by network nodes can indicate network-centric information (such as VRF or tenant) that may be used by service functions, or conveyed to another network node post-service pathing. In another example, external (to the network) systems such as orchestration, often has information that is valuable for service function policy decisions (in some cases, this information may not necessarily be deduced by network nodes). An orchestration platform placing workloads "knows" what application is being instantiated and can communicate this information to all NSH nodes via metadata. In yet another example, service functions can perform very detailed and valuable classification, in some cases they may terminate, and be able to inspect encrypted traffic. Service nodes having such service functions may update, alter or impose metadata information.

Regardless of the source, metadata reflects the "result" of classification. The granularity of classification may vary. For example, a network switch might only be able to classify based on 5-tuple, whereas, a service function may be able to inspect application information. Regardless of granularity, the classification information is represented as metadata in NSH. Once the metadata is added to NSH, the metadata is carried along the service path. Participant service nodes, e.g., service functions in the participant service nodes, can receive the metadata, and can use that metadata for local decisions and policy enforcement.

Figure 5:
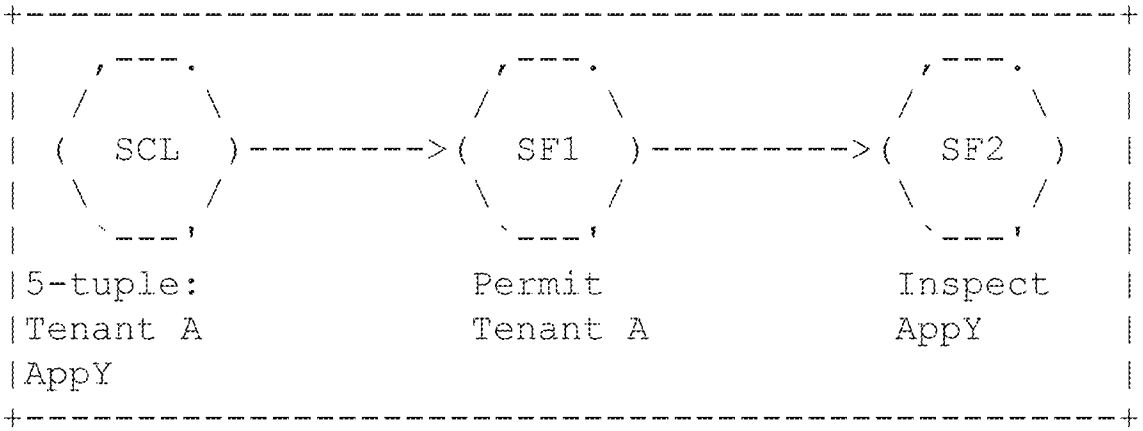
FIG. 5-6 illustrate policy enforcement using network service headers, according to some embodiments of the disclosure.
Figure 6:
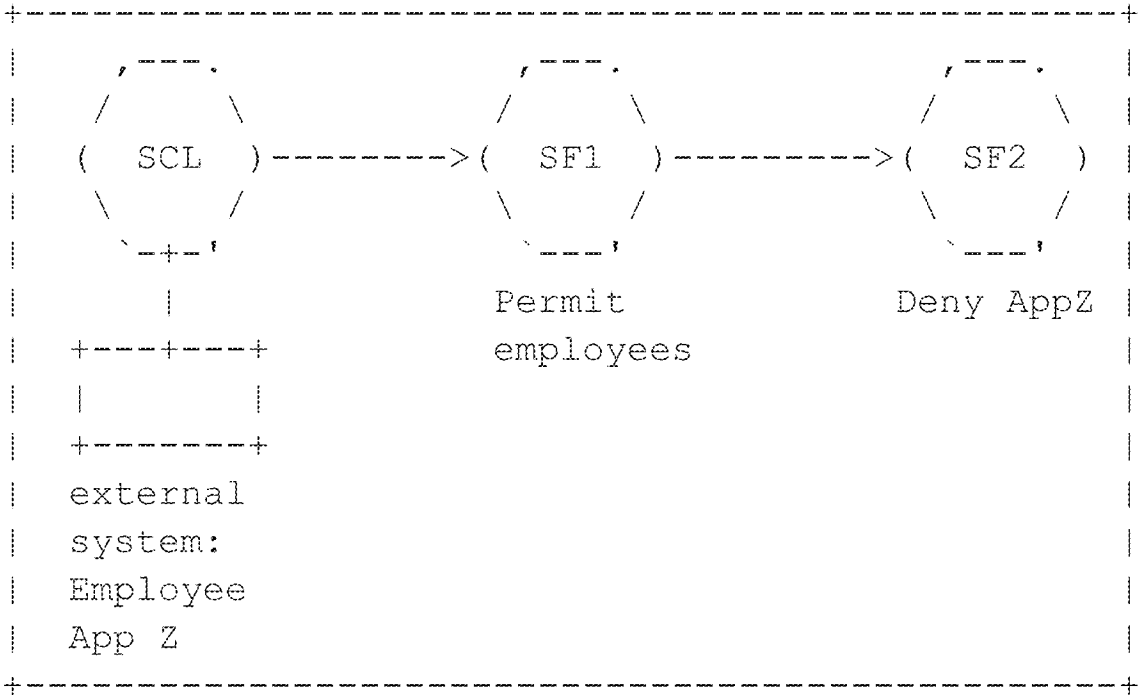

FIG. 5-6 illustrate policy enforcement using network service headers, highlighting the relationship between metadata and policy, according to some embodiments of the disclosure. FIG. 5 shows metadata having a 5-tuple (as a result of the initial classification) being added by the service classifier (shown as "SCL" in the FIGURE), whereas FIG. 6 shows metadata from external sources (as a result of the initial classification) being added by the service classifier (SCL). In both of the examples above, the service functions (e.g, SF1, SF2) perform policy decisions (e.g., permitting certain types of tenants, inspecting traffic from certain applications) based on the result of the initial classification. The SFs did not need to perform re-classification, rather they relied on antecedent classification for local policy enforcement.

Effects of Metadata Augmentation on Policy Enforcement on Traffic Flows

Figure 7:
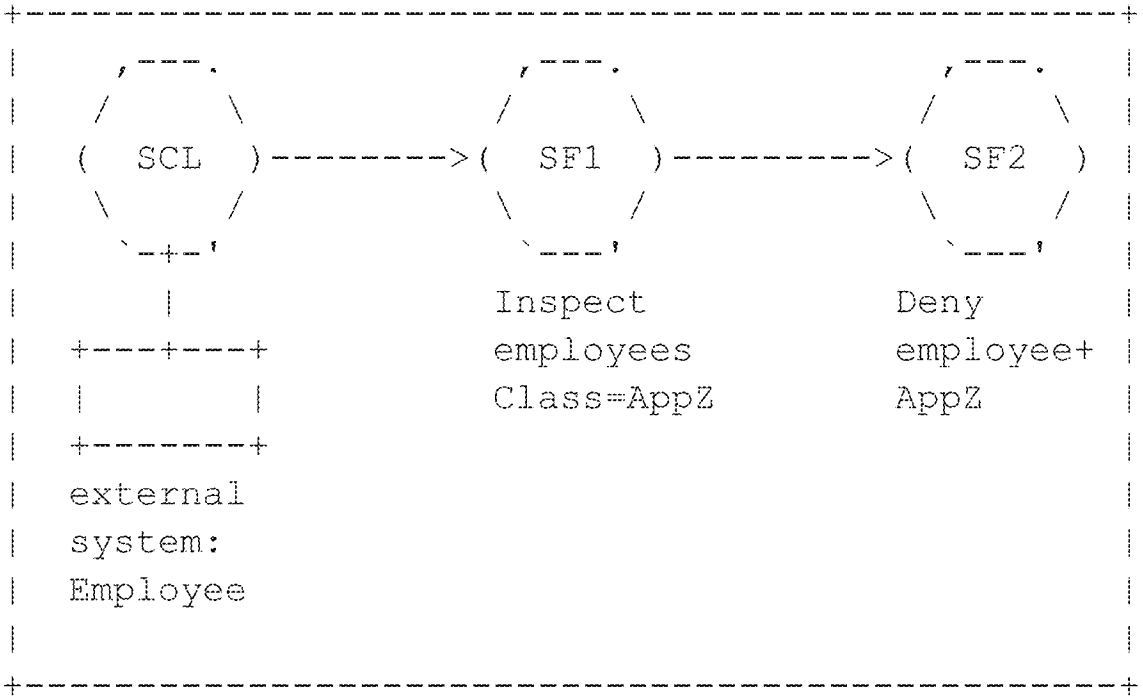
FIGS. 7-9 illustrate various metadata augmentations and their effect on policy enforcement, according to some embodiments of the disclosure.
Figure 8:
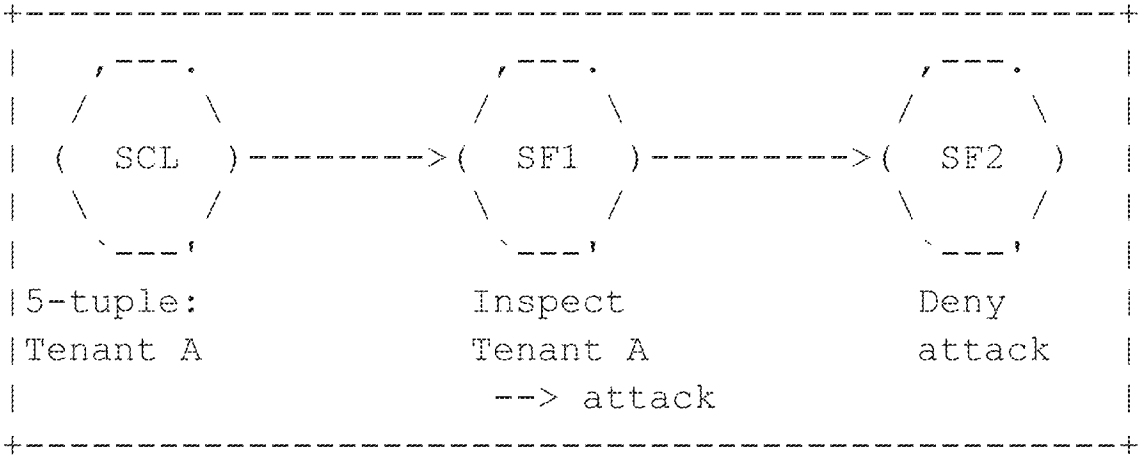
Figure 9:
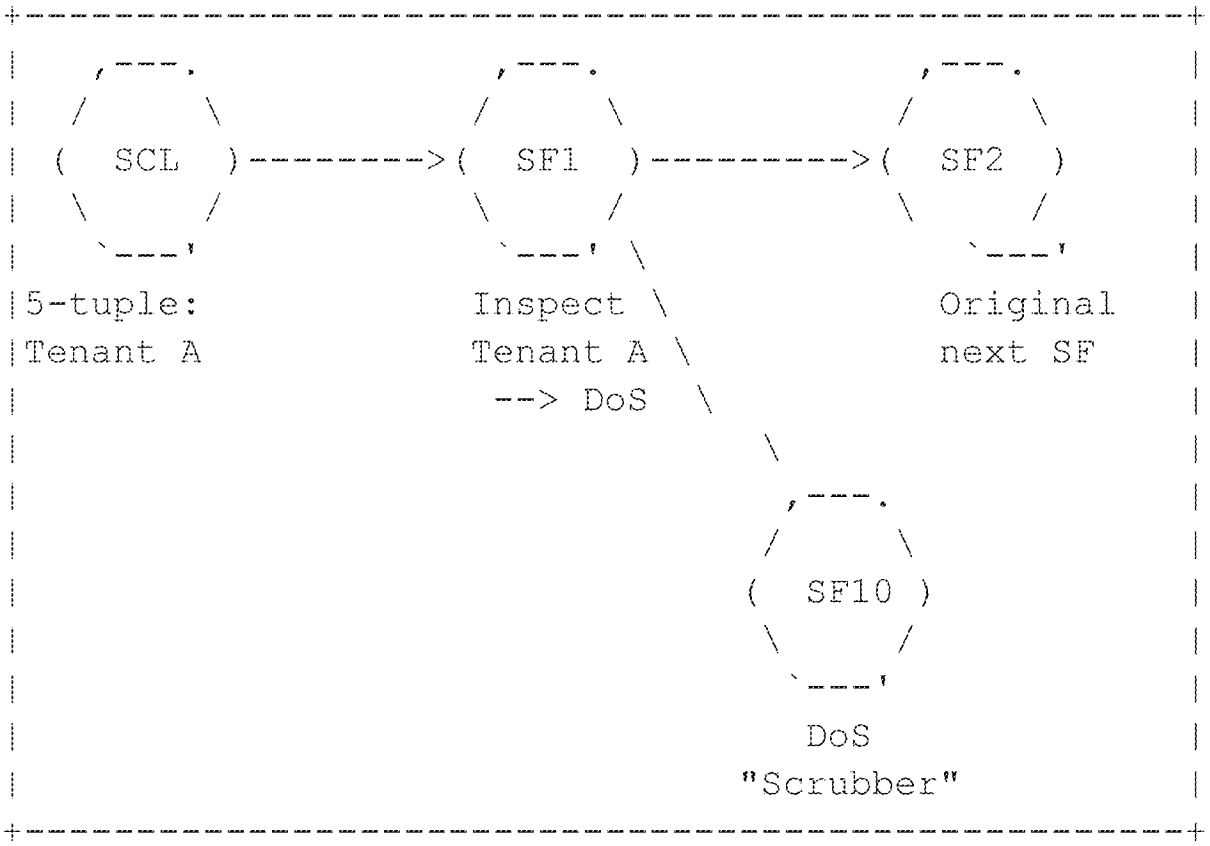

Post-initial metadata imposition (typically performed during initial service path determination, e.g., by the service classifier (SCL)), metadata may be augmented using classification performed by service functions of subsequent service nodes. FIGS. 7-9 illustrate various metadata augmentations and their effect on policy enforcement, according to some embodiments of the disclosure.

FIG. 7 shows that service function SF1 of a first service node can classifying the packet/frame as being associated with AppZ (e.g., Application Z), and the metadata can be augmented to reflect such classification. In this example, if the initial classification returned the tenant information, a secondary classification (e.g., SF1 is a deep packet inspection engine or server load balancer) may augment the tenant classification with application information. The tenant classification is still valid and present, but additional information has been added to it.

FIG. 8 shows that subsequent classification by SF1 of a first service node may update the initial classification if it is determined to be incorrect or not descriptive enough. For example, the initial classifier imposed metadata that describes the packet/frame as normal traffic associated with "tenant A", but a security service function SF1 determines that the traffic is really "attack" (i.e., malicious traffic). The secondary classification may replace the tenant classification with "attack" so that a further service function SF2 of a subsequent service node (e.g., a firewall) can deny the "attack" packet/frame.

While the SFC architecture describes the element of re-classification, in which a later classification results in a branching to the selection of a new SFP. It is noted that augmentation of metadata as described herein is distinctly different than the concept of "re-classification" solely for the purposes selecting a new service path, and in some cases, the augmentation of metadata can in fact complement "re-classification". FIG. 9 illustrates an example of augmentation of metadata complementing "re-classification" for the purposes of selecting a new service path. Metadata information may influence the service path selection since the service path identifier can represent the result of classification. A given service path identifier (SPI) can represent all or some of the metadata, and be updated based on metadata classification results. This relationship provides the ability to create a dynamic services plane based on complex classification without requiring each node to be capable of such classification, or requiring a coupling to the network topology. Phrased differently, besides augmenting the first metadata, the first service node (e.g., SF1) can further generate a second service path information different from the first service path information in response to generating the second metadata (shown as a path from SF1 to SF10), and replace the network service header with a different network service header having the second metadata and the second service path information to dynamically change the service path.

Figure 10:
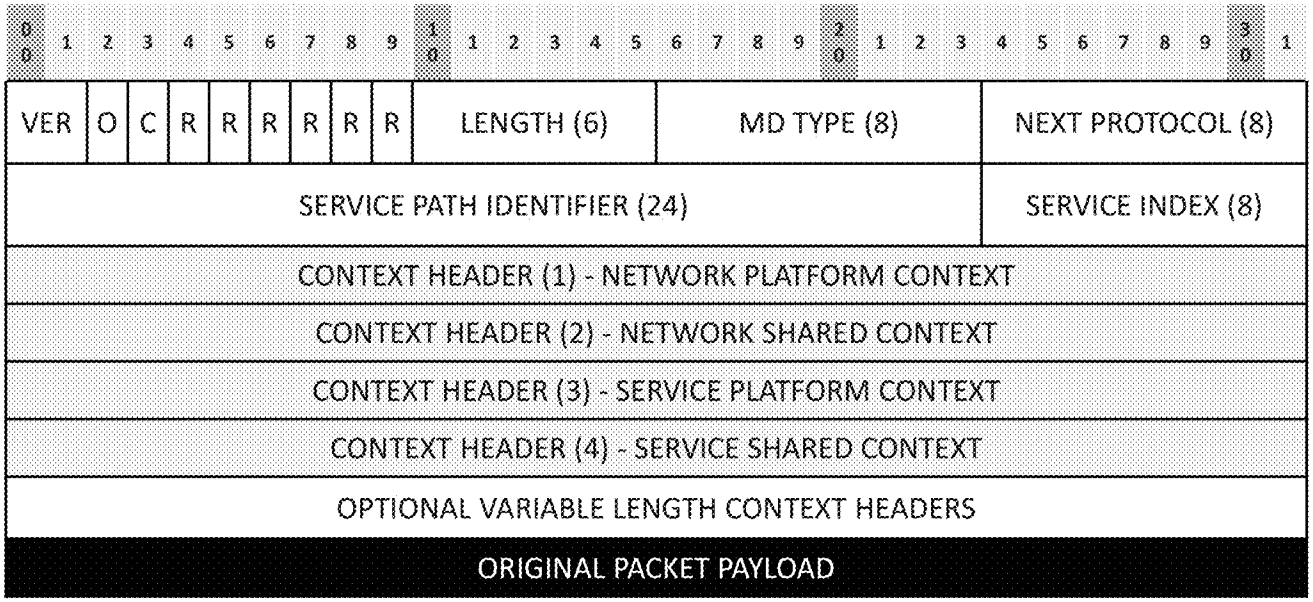
FIGS. 10-14 illustrate various metadata augmentation of a network service header over many classifiers, according to some embodiments of the disclosure.

FIGS. 10-14 illustrate various metadata augmentation of a network service header over many classifiers, according to some embodiments of the disclosure. FIG. 10 shows a template for the network service header having a plurality of fields in which metadata can be provided. Exemplary kinds of metadata can include:

- Network platform context: provides platform-specific metadata shared between network nodes. Examples include (but are not limited to) ingress port information, forwarding context and encapsulation type;
- Network shared context: metadata relevant to any network node such as the result of edge classification. For example, application information, identity information or tenancy information can be shared using this context header;
- Service platform context: provides service platform specific metadata shared between service functions. This context header is analogous to the network platform context, enabling service platforms to exchange platform-centric information such as an identifier used for load balancing decisions;
- Service shared context: metadata relevant to, and shared, between service functions. As with the shared network context, classification information such as application type can be conveyed using this context.

Figure 11:
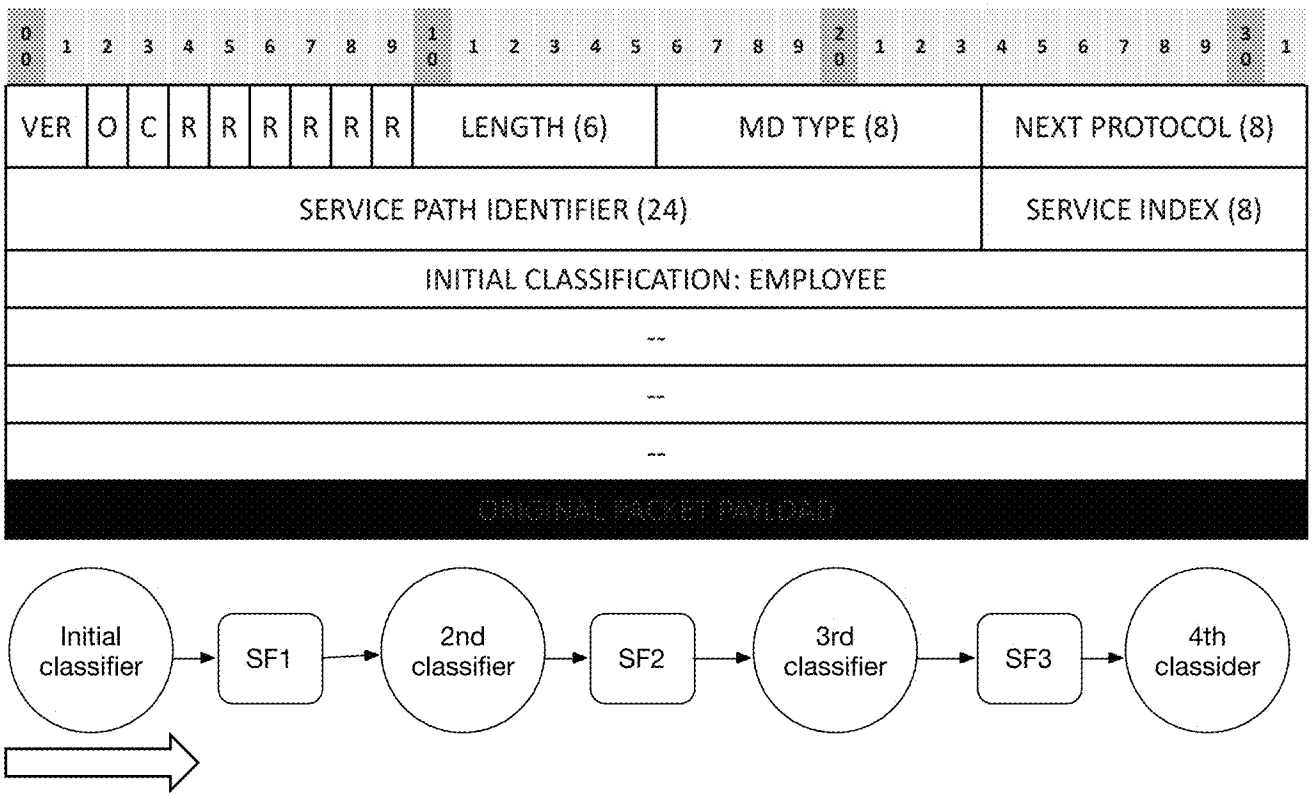
Figure 12:
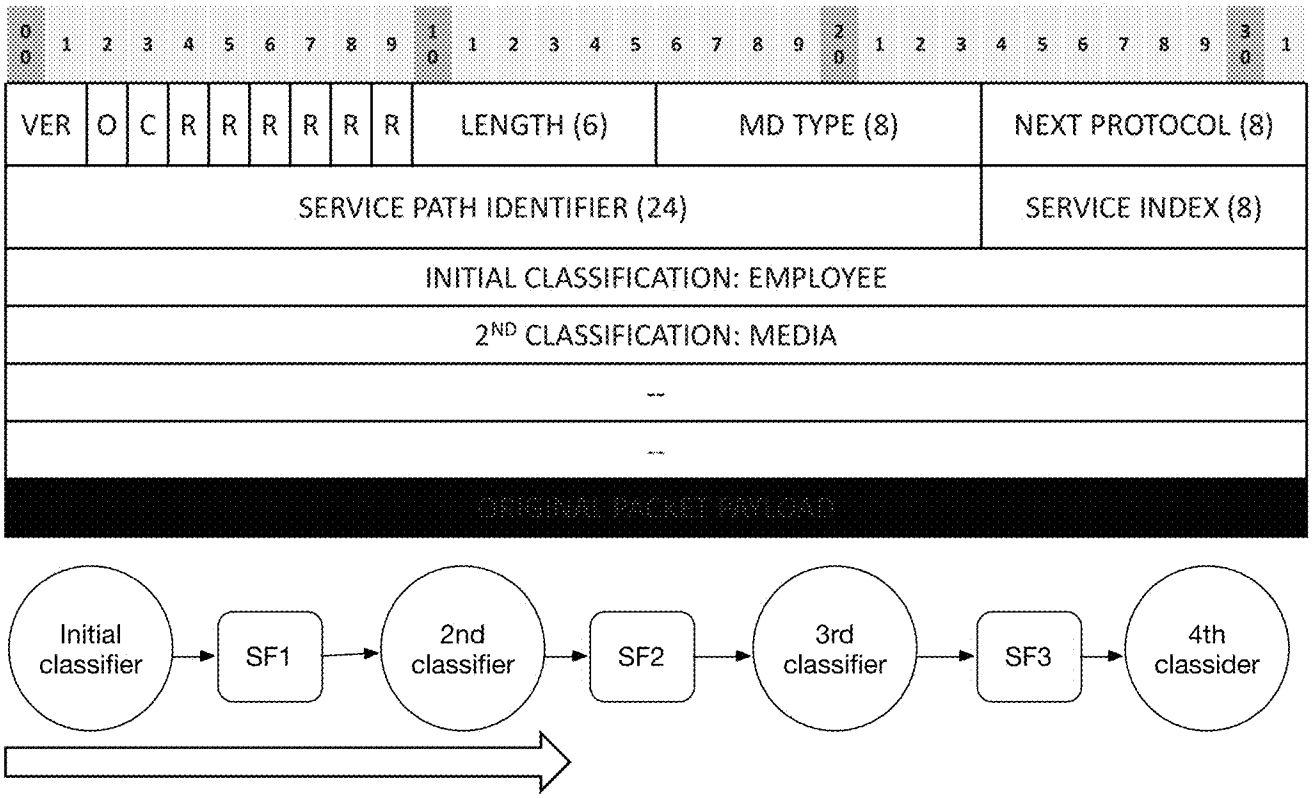
Figure 13:
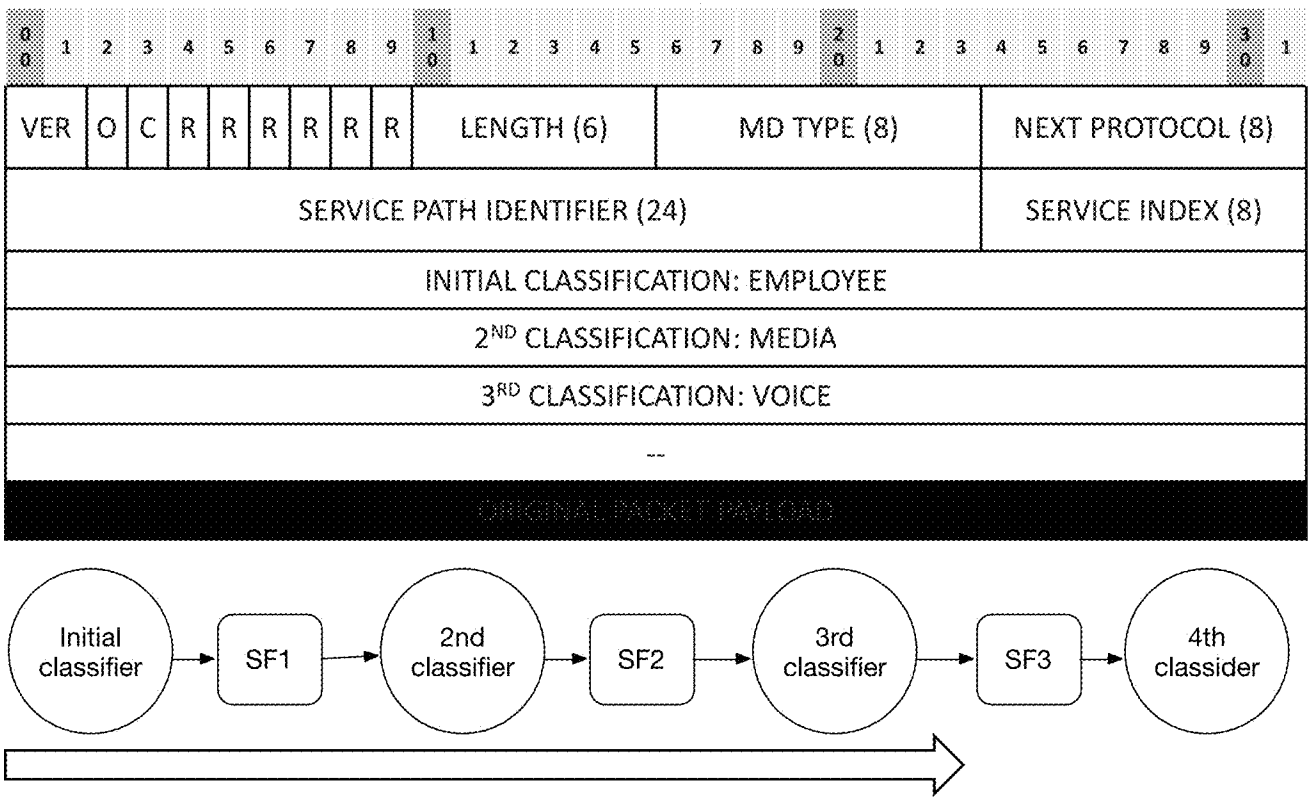
Figure 14:
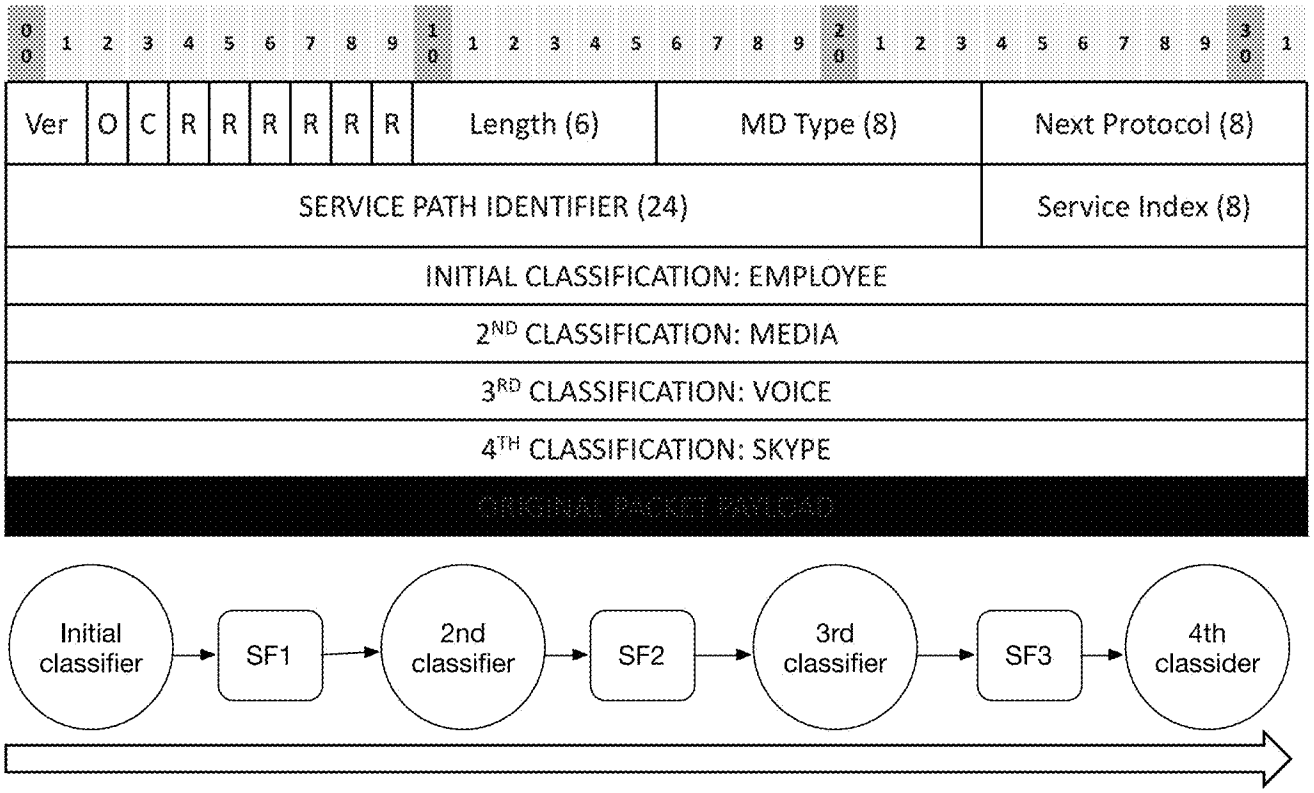

FIG. 11 shows that the initial classifier inserts metadata "employee" (as a result of classification by the initial classifier or an external source) into the NSH. FIG. 12 shows that a second classifier (e.g., a service node having a service function, service header processor, and metadata augmentation module) augments the metadata with "media". FIG. 13 shows that a third classifier (e.g., a service node having a service function, service header processor, and metadata augmentation module) augments the metadata with "voice". FIG. 14 shows that a fourth classifier (e.g., a service node having a service function, service header processor, and metadata augmentation module) augments the metadata with "Skype".

Usually, the additional information being added by the subsequent classifiers could not be deduced initially by the classifiers upstream due to capabilities, policy, or configuration. The NSH can efficiently carry encoded representation of the various classification results (where the encoding/semantics can be shared over a control plane). The service functions, e.g., SF1 . . . 3, at various service nodes in the service path can act on the packet/frames of the traffic flow, e.g., based on augmented metadata. For example, if service function SF3 is a firewall, it can deny or permit traffic being associated with "employee"+"media"+"voice" traffic, but allow "employee"+"media"+"file" traffic.

Exemplary Applications and/or Use Cases

The present disclosure describes metadata augmentation in a service function. There are various use cases that benefit with metadata based classification and augmentation.

In a first example, an initial classification in an enterprise network can classify a packet/frame based on whether the packet/frame is associated with a guest versus a regular employee and includes a first metadata indicating such classification in the NSH. Downstream, a service node can augment the first metadata by adding a second metadata which specifies that the packet is associated with Application X. The augmentation is done, e.g., by a metadata augmentation module of the service node, by updating and/or appending the metadata. The augmentation may involve either an update to an existing field or population of an empty field.

In a second example, a packet gateway (PGW) in a typical mobility environment can act as a primary/initial classifier to perform basic classification based on minimal input. The packet/frame may then carry the Access Point Name (APN) and other related Evolved UMTS Terrestrial Radio Access Network (E-UTRAN) details in metadata, which can be used by a virtual or subsequent classifier (e.g., a subsequent service node in the SFP) to perform secondary classification and augment the metadata.

In a third example, an enterprise SFC can be overlaid over a Service Provider infrastructure with its own SFC. In other words, a service node in the service path can receive SFC-encapsulated packets/frames and subjects them to the SP's local SFC.

Virtualizing the Classifier Function

To take advantage of the augmentation mechanism being virtualized over the SFP, the initial classifier and the service node(s) may provide varied classification functions, taking the previous classification as input and providing improved classifications as outputs. In one example, an access node in an Enterprise network or branch network can be enabled with basic classification and insertion of metadata to avoid burdening the access node to perform DPI inspections. This metadata information along with payload can be used by ingress nodes connecting to the datacenter for secondary classification and append further information to the metadata that can be used by downstream service nodes. In some cases, this functionality can be leveraged to virtualize the classifier function and use the access/edge nodes to just insert basic information relevant for classification and forward to the virtualized classifier function which augments the metadata with additional information relevant for other SFs.

Figure 15:
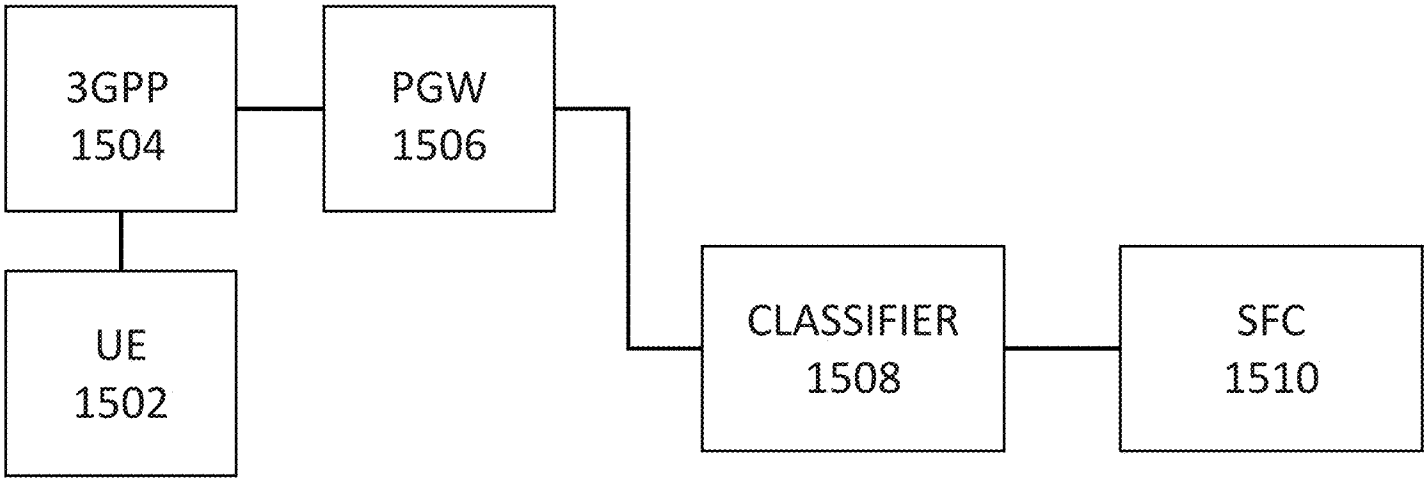
FIG. 15 shows a topology that illustrates how augmentation of metadata can virtualize the classifier function, according to some embodiments of the disclosure.

FIG. 15 shows a topology that illustrates how augmentation of metadata can virtualize the classifier function, according to some embodiments of the disclosure. In the topology shown, user equipment 1502 is communicably connected to the Packet Data Network Gateway (PGW) 1506. The Packet Data Network Gateway (PGW) 1506 connecting the 3GPP 1504 and Evolved Packet Core (EPC) cloud can perform basic classification to include the Access Point Name (APN) and other related details in the metadata of a packet/frame of a traffic flow. The (virtual) classifier 1508 apply the APN and other related details as input. The classifier performs secondary classification based on the actual packet (e.g., payload) and the metadata, and can augment the metadata to send further to SFs (shown as "SFC" 1510). The ability to add further classifiers as part of the Service Functions (or Forwarders) themselves provide finer granularity of metadata by allowing the augmentation the initial metadata with new or more refined information. Initial classification happens but any suitable service node having a service function along the service path might also add to that classification. The second level classification can be either based on the metadata alone or a combination of metadata and the payload.

NSH Metadata Based Load Balancing

A server load balancer (SLB) or Application Delivery Controller (ADC) is a network device that distributes traffic across a number of servers using load balancing algorithms (ranging from simple round robin to more sophisticated methods) based on L4 and/or L7 information in the packets. These devices are used to increase capacity and reliability of applications, and improve the overall performance by decreasing the burden on servers associated with the management of application sessions. Such devices rely heavily upon inspection of incoming packet flows (such as L4 and/or L7 information) to determine which classification rules to apply and therefore the outcome of the load-balancing decision for a given traffic flow. While some mechanisms provide sophisticated packet inspection capabilities, in some cases they lack the ability to extract the required information without first processing the L4 and/or L7 headers from the packet. More significantly, classification information that is not contained within the packet headers, but available via an external source(s) is not currently available to them, even though said information could be utilized to greatly enhance their load-balancing capabilities. The present disclosure describes the use of metadata, carried in Network Service Header (NSH), for load balancing decisions in addition to, or in lieu of payload (i.e. original packet) information. Such metadata being used for load balancing decisions can be augmented, or be used as the second metadata which augments the first metadata.

Network Service Header (NSH) as described in [draft-ietf-sfc-architecture], [draft-quinn-sfc-nsh], provides the mechanisms for the construction of service chains in a network and the forwarding of traffic through those service chains using network service headers carried within the data plane. In addition to path information, NSH carries so-called metadata: information about the packet/chain. This metadata is carried in NSH itself, either as fixed-size words, or via variable TLVs. Typically this metadata reflects the result of antecedent classification. For example, application type and subscriber information are two commonly used metadata values. The metadata is carried along the service path and used, per service, for policy enforcement. Using the metadata examples above, a firewall would, for instance, be able to permit or deny a certain application or subscriber without having to classify the packets to determine the application or subscriber information.

In many cases, the classification information carried in NSH metadata is not something that can be derived via packet/flow inspection, rather it conveys information from an external source. A common example is information supplied by an orchestration system. This system places application workloads and therefore "knows" what application is running. The orchestration system, via a metadata API, informs the service-chaining infrastructure about the application types, and that information is then carried as NSH metadata. This external information case is becoming increasingly common.

SLB/ADC devices will often constitute part of an NSH service chain, and as such they can take advantage of the metadata for local policy application, in this case, load-balancing decisions.

As an example, consider an SLB/ADC that front ends a set of web servers accessed by application URL. In the existing technique the SLB/ADC must examine the L7 HTTP headers to determine the URL being accessed and then use this information to determine which web server to use to service a particular packet flow. Using the NSH metadata as described in this present disclosure the SLB/ADC may now extract the URL information without needing to parse through the entire L7 HTTP header: the application information is inserted as NSH metadata, and in lieu of attempting to parse for URI or other packet information, the SLB service function uses the application information in NSH to make its policy decision.

In addition to the packet-centric information, the use of metadata derived from external sources as described above, augment load balancing decisions, enabling the policy decisions to be made on information that a SLB cannot derive absent of NSH metadata.

By adding this type of information to the NSH metadata the LB algorithms may be greatly enhanced leading to simpler and more sophisticated LB functionality.

Advantages of such use of metadata include:

1. SLB/ADC does not have to parse through packets looking for information to load balance upon
2. Load balancing decisions may be performed based on information that cannot be deduced by a load balancer. For example, application end-point group, externally derived information from Openstack etc.
3. Simpler SLB implementation
4. No need to couple SLB and IP management systems Addressing Security Concerns Overall, the SFC Security framework allowing augmentation of metadata or use of metadata can help provide security. Metadata augmentation can be protected from a security perspective as part of the overall SFC security framework. SFC metadata augmentation does not in itself make security weaker, and SFC can work with crypto and security mechanisms. In one example, SFC can be used in a trusted environment (e.g., DC). In this case if the middle box or classifier is hacked, NSH might not be the biggest problem. All DC tagging schemes (VXLAN for example, even VLANs to some extent have similar issues). In another example, SFC can be used in existing "safe" transports (e.g., IPsec, MACSEC, SSL) to carry NSH. In yet a further example, SFC can be used with NSH specific authenticity and confidentially mechanisms. In these cases, NSH itself can carry the crypto data as metadata. These NSH specific mechanisms can solve security for generically including for metadata augmentation. These SFC security approaches can effectively address security concerns over the (sensitive) metadata being carried in NSH.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for augmenting metadata of a network service header, the method comprising:

receiving, at a first service node of a first service path, a packet or frame of a traffic flow, wherein the packet or frame has a payload and the network service header including a first metadata and a first service path information identifying the first service path for the traffic flow and the first metadata is a result of a previous classification of the packet or frame;

classifying, by the first service node, at least one of the payload and the first metadata to [determining] *determine* a secondary classification and generate a second metadata different from the first metadata;

determining, by the first service node, from the secondary classification that the previous classification is incorrect and the second metadata [correct] *corrects* an error of the first metadata; [and]

augmenting, by the first service node, the first metadata with the second metadata before forwarding the packet or frame to a second service node of the first service path*;*

*wherein the augmenting the first metadata with the second metadata comprises generating a second service path information different from the first service path information in response to generating the second metadata; and*

*replacing the network service header with a different network service header having the second metadata and the second service path information, wherein the first service path and the second service path belong to a service plane and semantics of the second metadata of the network service header are shared via a control plane of the first service node and the second service node.*

2. The method of claim 1, wherein augmenting the first metadata comprises adding the second metadata to the network service header.

3. The method of claim 1, wherein augmenting the first metadata comprises replacing the first metadata of the network service header with the second metadata.

4. The method of claim 1, wherein the secondary classification performed by the first service node is different from the previous classification.

5. The method of claim 1, wherein an initial service classifier that performed the previous classification is not capable of performing the classification performed by the first service node.

6. The method of claim 1, further comprising replacing the previous classification with an attack classification upon which a subsequent service function is capable of acting.

7. The method of claim 1, further comprising updating the previous classification with the secondary classification determined by the first service node.

8. The method of claim 1, wherein the second service node applies a policy on the packet or frame of the traffic flow based on the second metadata.

9. The method of claim 1, further comprising:

generating a different network service header having the second metadata; and encapsulating the packet or frame of the traffic flow with the different network service header.

[10. The method of claim 1, further comprising:

generating a second service path information different from the first service path information in response to generating the second metadata; and replacing the network service header with a different network service header having the second metadata and the second service path information.]

[11. The method of claim 1, wherein semantics of the second metadata of the network service header is shared via a control plane of the first service node and the second service node.]

12. A service node in a service function path for augmenting metadata of a network service header, the service node comprising:

at least one memory element having instructions stored thereon;

at least one [processors] *processor* coupled to the at least one memory element and configured to execute the instructions to cause the service node to:

receive a packet or frame of a traffic flow, wherein the packet or frame has a payload and the network service header including a first metadata and a first service path information identifying the service function path for the traffic flow, wherein the first metadata is a result of a previous classification of the packet or frame;

classify at least one of the payload and the first metadata to determine a secondary classification and generate a second metadata different from the first metadata;

determine from the secondary classification that the previous classification is incorrect and the second metadata corrects an error of the first metadata; [and]

augment the first metadata with the second metadata before forwarding the packet or frame to a second service node in the service function path;

*generate a second service path information different from the first service path information in response to generating the second metadata; and*

*replace the network service header with a different network service header having the second metadata and the second service path information, wherein the first service path and the second service path belong to a service plane and semantics of the second metadata of the network service header are shared via a control plane of the first service node and the second service node.*

13. The service node of claim 12, wherein augmenting the first metadata comprises adding the second metadata to the network service header.

14. The service node of claim 12, wherein augmenting the first metadata comprises replacing the first metadata of the network service header with the second metadata.

15. The service node of claim 12, wherein the instructions further cause the service node to:

generate a different network service header having the second metadata; and encapsulate the packet or frame of the traffic flow with the different network service header.

[16. The service node of claim 12, wherein the instructions further cause the service node to:

generate a second service path information different from the first service path information in response to generating the second metadata; and replace the network service header with a different network service header having the second metadata and the second service path information.]

17. A computer-readable non-transitory medium comprising one or more instructions for augmenting metadata of a network service header, that when executed on a processor configure the processor to:

receive, by a first service node a packet or frame of a traffic flow, wherein the packet or frame has a payload and the network service header including a first metadata and a first service path information identifying the first service path for the traffic flow, wherein the first metadata is a result of a previous classification of the packet or frame;

classify, by the first service node, at least one of the payload and the first metadata to determine a secondary classification and generate a second metadata different from the first metadata;

determine, by the first service node, from the second classification that the previous classification is incorrect and the second metadata corrects an error of the first metadata; [and]

augment, by the first service node, the first metadata using the second metadata before forwarding the packet or frame to a second service node;

*generate a second service path information different from the first service path information in response to generating the second metadata; and*

*replace the network service header with a different network service header having the second metadata and the second service path information, wherein the first service path and the second service path belong to a service plane and semantics of the second metadata of the network service header are shared via a control plane of the first service node and the second service node.*

18. The computer-readable non-transitory medium of claim 17, wherein the one or more instructions further configure the processor to replace the previous classification with an attack classification upon which a subsequent service function is capable of acting.

19. The computer-readable non-transitory medium of claim 17, wherein augmenting the first metadata comprises replacing the first metadata of the network service header with the second metadata.

20. The computer-readable non-transitory medium of claim 17, wherein the second service node applies a policy on the packet or frame of the traffic flow based on the second metadata.

* * * * *